Patented Nov. 8, 1949

2,487,766

UNITED STATES PATENT OFFICE 2,487,766

ADHESIVE CONTAINING SODIUM SALT OF CARBOXYMETHYLCELLULOSE AND UREA OR MELAMINE FORMALDEHYDE

Charles Herbert Schmidt, Stamford, Conn., assignor to American Cyanamid Company, New York, N. Y., a corporation of Maine No Drawing. Application December 20, 1946, Serial No. 717,603

17 Claims. (Cl. 260—15)

This invention relates to adhesives and, more particularly, it is directed to thermosetting amino type adhesives of improved spread characteristics, accomplished by the incorporation therein of a neutral sodium salt of glycolic acid ether of cellulose.

Thermosetting aminoplasts, such as melamine resins and mixed resins having melamine as a component thereof, have been developed as adhesives capable of producing a bond which will withstand severe weathering conditions, and having superior water and boil resistance. This type of adhesives are generally superior to the more widely used prior adhesives, in many respects. However, these adhesives have a relatively high glue line cost of application, caused, in part, by the poor flow characteristics which make it necessary to apply a heavy spread of the adhesive to get complete coverage on the materials that are bonded, although adequate bond strength is obtained with incompletely covered articles. Attempts have been made to improve the flow characteristics of these adhesives by the addition of wetting agents, proteins, polyvinyl alcohol, partially hydrolyzed starch, extended dilution with alcohol and water, and other standard procedures. For various reasons, such as separation of the modifier from the adhesive, effecting too low a viscosity, and others having no marked effect on the flow characteristics, have failed to solve the problem.

It has now been found, as will be described hereinafter, that the incorporation of a neutral sodium salt of the glycolic acid ether of cellulose to the adhesive, will thicken the adhesive sufficiently to permit dilution and spreading of the adhesive in a uniform manner with commercial equipment, at a substantially reduced cost, without sacrifice of bond strength and weather resistance.

Several satisfactory methods may be employed for incorporating the thickening agent, the neutral sodium salt of glycolic acid ether of cellulose, into the adhesive. For example, one method comprises blending the thickening agent with the melamine used in the preparation of the melamine formaldehyde resinous syrup, prior to reacting with formaldehyde. Another method is to add the thickening agent to the melamine formaldehyde syrup prior to drying or blending with other adhesive syrups, such as urea formaldehyde syrup. The thickening agent could be added to the mixed resin, syrups, or resin component other than the melamine syrup. Another suitable method comprises adding the thickening agent with an extender and buffer, and blending this mixture, which is readily dispersable in water, prior to the addition of the resin component to the mixture.

From a practical viewpoint, it is desirable to use medium viscosity grade of the sodium salt of glycolic acid ether of cellulose in this invention, although low and extra high viscosity grade are satisfactory. Only approximately 1.25% of medium viscosity thickening agent, based on resin solid, is required to effect the desired result, and this quantity of this viscosity thickening agent results in a greater spray drier efficiency when the thickening agent is added to the resinous syrup, prior to spray drying. Only approximately 0.5% of the extra high viscosity grade thickening agent is necessary to effect the desired results. The particular quantity or percent of thickening agent is not specifically critical, as satisfactory results are obtained with the medium viscosity thickening agent present in an amount about 2.5% based on the weight of resin solids, but the optimum results are obtained with a medium viscosity of about 1.25% to about 2.5%, with corresponding lesser amounts when the higher viscosity product is used, and corresponding higher amounts when the lower viscosity product is used. All grades of the salt, high, medium, and low viscosity, are water soluble.

In order to more fully illustrate the invention, the following examples are given:

*Example 1*

A melamine formaldehyde resinous syrup obtained by reacting 3 mols of formaldehyde with 1 mol of melamine, and an urea formaldehyde resinous syrup obtained by reacting 1.7 mols of formaldehyde per mol of urea, were blended in the ratio of 97 parts of the melamine syrup to 110 parts of the urea syrup, and blended therewith were 139 parts of a 2% solution of the neutral sodium salt of glycolic acid ether of cellulose. This mix solution was then spray dried to give a solid resinous material having the thickening agent incorporated therein. Several adhesives were prepared by blending 80.8 parts of this thickening agent modified resin, 2.9 parts of tricalcium phosphate, 4.8 parts wood flour, and 11.5 parts walnut shell flour, and dispersing these blends in sufficient water to give adhesive mixes containing 40% solids, 45% solids, and 50% solids. These three adhesive mixes were then spread at varying quantities and cured under different conditions. There was 2 to 3 hour delay between the coating and curing time, and all cures were effected at 250 p. s. i. pressure. A summary of these results are given in the following table:

| Dry Adhesive Spread, lbs./1000 sq. ft. Single glue line | 40% Solids—Shear Strength | | | | 45% Solids—Shear Strength | | | | 50% Solids—Shear Strength | | | |
|---|---|---|---|---|---|---|---|---|---|---|---|---|
| | 240° F.—10 min. | | 300° F.—6 min. | | 240° F.—10 min. | | 300° F.—6 min. | | 240° F.—10 min. | | 300° F.—6 min. | |
| | Dry | Boil (3 hrs.) | Dry | Boil (3 hrs.) | Dry | Boil (3 hrs.) | Dry | Boil (3 hrs.) | Dry | Boil (3 hrs.) | Dry | Boil (3 hrs.) |
| 8 to 9 | 450 | 250 | 500 | 350 | | | | | | | | |
| 9 to 10 | 460 | 270 | 470 | 270 | | | | | | | | |
| 10 to 11 | 360 | 220 | 460 | 260 | | | | | | | | |
| 11 to 12 | | | | | 500 | 310 | 520 | 380 | 580 | 430 | 490 | 360 |
| 12 to 13 | | | | | 530 | 340 | 470 | 320 | | | | |
| 13 to 14 | | | | | 550 | 360 | 490 | 420 | 520 | 410 | 520 | |
| 14 to 15 | | | | | 490 | 360 | 540 | 460 | 610 | 470 | | 470 |
| 15 to 16 | | | | | 540 | 430 | 570 | 430 | 610 | 480 | 550 | 400 |
| | | | | | | | | | 540 | 410 | 530 | 400 |

The above experiments were repeated with a resin obtained by dissolving 2.8 parts of the dry thickening agent, the neutral sodium salt of glycolic acid ether of cellulose, in the 110 parts urea formaldehyde syrup prior to blending it with the 97 parts melamine formaldehyde syrup. According to this process of incorporating the thickener into the resin, the necessity of making a solution of the thickening agent was eliminated. It was blended with extenders and buffers, and the blend dispersed in water as needed. Substantially equivalent results were obtained with this thickened resin, in this manner, as were obtained in the example given herein above. Additional experiments were conducted by dispersing the thickening agent and extenders in the resin syrups prior to spray drying. The dry product obtained, in this manner, was packaged for dispersion in water to subsequently effect an adhesive emulsion when desired.

*Example 2*

An adhesive was prepared by blending 850 parts of melamine and 55 parts of neutral sodium salt of glycolic acid ether of cellulose, and reacting with 1650 parts of 37% formaldehyde solution. This resultant syrup was blended with the syrup obtained by reacting 1150 parts of 37% formaldehyde solution with 405 parts of urea. The mixture was then spray dried, and 80.8 parts of the dry product was blended with 2.9 parts of tricalcium phosphate, 4.8 parts wood flour, 11.5 parts of walnut shell flour, and sufficient water to give adhesives containing 50% solids and 45% solids.

The adhesives prepared in this manner were spread in varying quantities and cured at 300° F., and 250 p. s. i. pressure for 6 minutes, with a delay of two or three hours between spreading and curing. The following table summarizes the results obtained with these adhesives.

| Dry Adhesive Spread lbs./1000 sq. ft. Single Glue Line | Shear Strength | | | |
|---|---|---|---|---|
| | 50% Solids | | 45% Solids | |
| | Dry | Boil (3 hrs.) | Dry | Boil (3 hrs.) |
| 11 to 12 | 550 | 340 | 610 | 420 |
| 12 to 13 | | | 590 | 310 |
| 13 to 14 | 540 | 400 | 590 | 290 |
| 14 to 15 | 570 | 320 | 640 | 400 |
| 15 to 16 | 590 | 400 | | |
| 16 to 17 | | | | |

*Example 3*

An adhesive mix was prepared by mixing 11.5 parts of walnut shell flour, 4.8 parts wood flour, 2.9 parts tricalcium phosphate, and 2.0 parts of the neutral sodium salt of glycolic acid ether of cellulose in 125 parts of water, mixing by mechanical agitation until homogeneous, thereafter 78.8 parts of a resin obtained by spray drying a mixture of melamine formaldehyde resin syrup and urea formaldehyde resin syrup in equal proportions of resin solids; the melamine formaldehyde syrup being the reaction product of 3 mols of formaldehyde, and 1 mol of melamine, and the urea formaldehyde resin syrup being the reaction product of 2.1 mols of formaldehyde per mol of urea. Plywood panels coated with this adhesive and cured, after 2 to 3 hours delay, by pressing at 300° F. and 250 p. s. i., for 6 minutes, gave good bonds, the results of which are tabulated as follows:

| Dry Adhesive Spread lbs./1000 sq. ft. Single Glue Line | Shear Strength | |
|---|---|---|
| | Dry | Boil (3 hrs.) |
| 11 to 12 | 410 | 240 |
| 12 to 13 | 410 | 230 |
| 13 to 14 | 420 | 280 |
| 14 to 15 | 510 | 480 |

In place of the melamine resins and modified melamine resins illustrated in the examples, other suitable melamine resins and modified melamine resins may be employed; and, urea resins may be employed, if water resistance and boil resistance is not required of the bond. Urea resins were suitably thickened with the neutral sodium salt of glycolic acid ether of cellulose to give smooth adhesives, but these adhesives had poor water and boil resistance, whereas a mixed urea and melamine resin had excellent water and boil resistance. Likewise, the specific extenders and quantities thereof are not limitations, other extenders and quantities may be satisfactorily employed in the invention. It is desirable, however, to use a fine mesh extender whether wood flour, walnut shell flour, or other extender is used.

The buffers, weak salt of a mineral acid, are not essential ingredients, but desirable ingredients. Other buffers may be satisfactorily employed in the invention, in lieu of tricalcium phosphate, but this particular buffer is preferred, as it has the advantage of functioning as a breaker to prevent the resin from caking, in addition to its function as a buffer.

I claim:

1. An adhesive comprising an homogeneous aqueous dispersion of a thermosetting resin selected from the group consisting of melamine-formaldehyde and urea-formaldehyde resins, and 0.5–2.5% of the neutral sodium salt of glycolic acid ether of cellulose based on the resin solids weight.

2. An adhesive comprising an homogeneous aqueous dispersion of a melamine formaldehyde resin, and 0.5-2.5% of the neutral sodium salt of glycolic acid ether of cellulose based on the resin solids weight.

3. An adhesive comprising an homogeneous aqueous dispersion of a thermosetting mixture of melamine formaldehyde resin, an urea-formaldehyde resin and 1.25%-2.5% of the neutral sodium salt of glycolic acid ether of cellulose medium viscosity based on the resin solids weight.

4. An adhesive comprising an homogeneous aqueous dispersion of a thermosetting mixture of melamine-formaldehyde and urea-formaldehyde resins, up to 20% of finely subdivided inert fillers based on the weight of resin solids, alkaline buffer salt, and 0.5-2.5% of the neutral sodium salt of glycolic acid ether of cellulose based on the resin solids weight.

5. An adhesive comprising an homogeneous aqueous dispersion of a resin mixture containing substantially equal parts of urea-formaldehyde and melamine formaldehyde resins, and the medium viscosity neutral sodium salt of glycolic ether of cellulose present in an amount from about 1.25 to about 2.5% based on the dry resin solids.

6. An adhesive comprising an homogeneous aqueous dispersion of a thermosetting melamine-formaldehyde resin, and 1.25-2.5% of the neutral sodium salt of the glycolic acid ether of cellulose based on the resin solids weight.

7. A composition capable of forming an adhesive emulsion when dispersed in water, comprising a thermosetting melamine-formaldehyde resin, and 0.5-2.5% of the neutral sodium salt of glycolic acid ether of cellulose based on the resin solids weight.

8. A composition capable of forming an adhesive emulsion when dispersed in water, comprising a thermosetting mixture of melamine-formaldehyde resin, an urea-formaldehyde resin, formaldehyde resin, finely subdivided inert fillers based up to 20% finely subdivided inert fillers based on the weight of resin solids, and 1.25-2.5% of the neutral sodium salt of glycolic acid ether of cellulose medium viscosity based on the resin solids weight.

9. A composition capable of forming an adhesive emulsion when dispersed in water, comprising a thermosetting resinous mixture containing copolymerized melamine formaldehyde and urea-formaldehyde resins, up to 20% based on the weight of resin solids of finely subdivided wood extenders, and about 2.0% of the neutral sodium salt of glycolic acid ether of cellulose medium viscosity based on the resin solids weight.

10. A process for preparing a dry component capable of forming in aqueous medium an adhesive comprising dispersing the neutral sodium salt of glycolic acid ether of cellulose in a thermosetting melamine-formaldehyde resin aqueous syrup, and spray drying the resulting solution, said neutral sodium salt of the glycolic ether of cellulose being of medium viscosity and being present in an amount from 1.25 to 2.5% based on the weight of resin solids.

11. A process for preparing an adhesive mix comprising forming an aqueous emulsion of a thermosetting melamine-formaldehyde resin and 0.5-2.5% of the neutral sodium salt of glycolic acid ether of cellulose based on the resin solids weight.

12. A process for preparing a solid composition capable of forming an adhesive emulsion when dispersed in water, comprising blending melamine with 0.5-2.5% of the neutral sodium salt of the glycolic acid ether of cellulose based on the resin solids weight, reacting the melamine with an aqueous solution of formaldehyde, and spray drying the resulting resinous syrup.

13. An adhesive comprising an homogeneous aqueous dispersion of approximately 81 parts of a resinous mixture containing equal parts of urea-formaldehyde and melamine formaldehyde resins, approximately 16 parts finely subdivided wood extenders, and approximately 2.0 parts of the neutral sodium salt of glycolic ether of cellulose.

14. An adhesive comprising an homogeneous aqueous dispersion of about 80 parts of a melamine formaldehyde resin, about 5 parts of wood flour, about 11 parts of walnut shell flour, about 3 parts of tricalcium phosphate, and about 2 parts of the neutral sodium salt of glycolic acid ether of cellulose.

15. A dry composition capable of forming an adhesive emulsion when dispersed in water, comprising a thermosetting resinous mixture containing copolymerized melamine formaldehyde and urea-formaldehyde resins, present in substantially equal portions, up to 20% wood extenders based on the weight of resin solids, and the neutral sodium salt of glycolic acid ether of cellulose present in an amount from about 1.25% to about 2.5%, based on the weight of resin solids.

16. A process for preparing an adhesive mix comprising forming an aqueous emulsion of a mixture of melamine formaldehyde and urea-formaldehyde resins, up to 20% of inert fillers based on the weight of resin solids, alkaline buffer salts, and 0.5-2.5% of the neutral sodium salt of glycolic acid ether of cellulose based on the resin solids weight.

17. An adhesive comprising an homogeneous aqueous dispersion of an urea-formaldehyde resin, and 0.5-2.5% of the neutral sodium salt of glycolic acid ether of cellulose based on the resin solids weight.

CHARLES HERBERT SCHMIDT.

REFERENCES CITED

The following references are of record in the file of this patent:

UNITED STATES PATENTS

| Number | Name | Date |
| --- | --- | --- |
| 2,237,240 | Sponsel | Apr. 1, 1940 |
| 2,245,491 | Menger | June 10, 1941 |
| 2,370,517 | Bass | Feb. 27, 1945 |
| 2,388,143 | Harris | Oct. 30, 1945 |
| 2,400,820 | Glarum | May 21, 1946 |

OTHER REFERENCES

Hollabaugh Ind. and Eng. Chem., vol. 37, pages 943–947, Oct. 1945, Laq. Lit. C. E.

National Paint, Varnish and Lacquer Association, Inc. Circular 688, Aug. 1944; pages 191–194.

Chemical and Metallurgical Eng., March 1944, pages 139–140. (Scientific Libr.).